(12) United States Patent
Moler et al.

(10) Patent No.: US 7,040,349 B2
(45) Date of Patent: May 9, 2006

(54) PIEZO-ELECTRIC ACTUATED MULTI-VALVE MANIFOLD

(75) Inventors: Jeff Moler, Sarasota, FL (US); Mark Woozley, Riverview, FL (US); John Bugel, Largo, FL (US)

(73) Assignee: Viking Technologies, L.C., Sarasota, FL (US)

( * ) Notice: Subject to any disclaimer, the term of this patent is extended or adjusted under 35 U.S.C. 154(b) by 174 days.

(21) Appl. No.: 10/817,512

(22) Filed: Apr. 2, 2004

(65) Prior Publication Data

US 2005/0016606 A1    Jan. 27, 2005

Related U.S. Application Data

(63) Continuation-in-part of application No. 10/107,951, filed on Mar. 27, 2002, now Pat. No. 6,759,790, and a continuation-in-part of application No. 10/613,138, filed on Jul. 3, 2003.

(60) Provisional application No. 60/460,666, filed on Apr. 4, 2003.

(51) Int. Cl.
*F16K 11/10* (2006.01)

(52) U.S. Cl. .......................... 137/884; 251/11
(58) Field of Classification Search ................ 137/884, 137/269, 271; 251/11
See application file for complete search history.

(56) References Cited

U.S. PATENT DOCUMENTS

| | | |
|---|---|---|
| 3,099,289 A | 7/1963 | Neilson et al. |
| 4,080,873 A | 3/1978 | Bauer et al. |
| 4,106,390 A | 8/1978 | Kodaira et al. |
| 4,121,504 A | 10/1978 | Nowak |
| 4,379,335 A | 4/1983 | Kirsch et al. |
| 4,431,873 A | 2/1984 | Dunn et al. |
| 4,450,753 A | 5/1984 | Basrai et al. |
| 4,481,451 A | 11/1984 | Kautz et al. |
| 4,481,768 A | 11/1984 | Goshorn et al. |
| 4,628,499 A | 12/1986 | Hammett |
| 4,686,338 A | 8/1987 | Kashiwagi et al. |
| 4,736,131 A | 4/1988 | Fujimoto |

(Continued)

FOREIGN PATENT DOCUMENTS

DE    199 12 334 A 1    9/2000

(Continued)

OTHER PUBLICATIONS

Karim Khayati, Pascal Bigras, and Louis-A. Dessaint; Non-linear Control of Pneumatic Systems; Ecole de Technologie Superieure; 1100, rue Notre-Dame Quest, Montreal (Quebec) H3C 1K3.

(Continued)

*Primary Examiner*—John Fox
(74) *Attorney, Agent, or Firm*—Young & Basile, P.C.

(57) ABSTRACT

An apparatus controls flow of a fluid from at least one inlet port to at least one outlet port. A support has a rigid, non-flexible portion, at least one pivotable relatively rigid, non-flexible, folded-back arm portion extending from the rigid portion, at least one surface connected to folded-back arm portion for movement relative to the support, and a rigid, non-flexible force transfer member operably positioned for driving the pivotable folded-back arm portion with a loss of motion of less than 40%. An electrically operated actuator operably engages between the rigid portion and the force transfer member to pivot the folded-back arm portion in response to an electrical activation of the actuator. A manifold includes a fluid passage communicating with at least one valve seat and operably engageable with respect to at least one corresponding valve body for movement between a closed position and an opened position.

20 Claims, 4 Drawing Sheets

U.S. PATENT DOCUMENTS

| | | | |
|---|---|---|---|
| 4,741,247 A | 5/1988 | Glomeau et al. | |
| 4,763,560 A | 8/1988 | Sasaki | |
| 4,790,233 A | 12/1988 | Backe et al. | |
| 4,808,874 A | 2/1989 | Stahlhuth | |
| 4,819,543 A | 4/1989 | Leinen | |
| 4,878,417 A | 11/1989 | Facon | |
| 4,901,625 A | 2/1990 | Bussan et al. | |
| 4,932,311 A | 6/1990 | Mibu et al. | |
| 5,154,207 A | 10/1992 | Bolt | |
| 5,211,196 A | 5/1993 | Schwelm | |
| 5,271,226 A | 12/1993 | Stone | |
| 5,333,455 A | 8/1994 | Yoshioka | |
| 5,388,751 A | 2/1995 | Harada et al. | |
| 5,400,824 A * | 3/1995 | Gschwendtner et al. | 137/625.28 |
| 5,424,941 A | 6/1995 | Bolt et al. | |
| 5,425,941 A | 6/1995 | Wilson et al. | |
| 5,431,086 A | 7/1995 | Morita et al. | |
| 5,465,021 A | 11/1995 | Visscher et al. | |
| 5,546,847 A | 8/1996 | Rector et al. | |
| 5,587,536 A | 12/1996 | Rasmussen | |
| 5,881,767 A | 3/1999 | Loser | |
| 5,950,668 A | 9/1999 | Baumann | |
| 6,003,428 A | 12/1999 | Mundie et al. | |
| 6,023,121 A * | 2/2000 | Dhuler et al. | 310/307 |
| 6,085,632 A | 7/2000 | Stoll et al. | |
| 6,230,606 B1 | 5/2001 | Sato | |
| 6,234,060 B1 | 5/2001 | Jolly | |
| 6,255,934 B1 * | 7/2001 | Gadini et al. | 337/393 |
| 6,291,928 B1 | 9/2001 | Lazarus et al. | |
| 6,305,264 B1 | 10/2001 | Yang et al. | |
| 6,333,583 B1 * | 12/2001 | Mahadevan et al. | 310/306 |
| 6,431,340 B1 | 8/2002 | Ineson et al. | |
| 6,453,261 B1 | 9/2002 | Boger et al. | |
| 6,467,264 B1 | 10/2002 | Stephenson et al. | |
| 6,523,451 B1 | 2/2003 | Liao et al. | |
| 6,548,938 B1 | 4/2003 | Moler et al. | |
| 6,567,255 B1 | 5/2003 | Panzer et al. | |
| 6,619,142 B1 * | 9/2003 | Forster et al. | 733/861.74 |
| 6,642,067 B1 | 11/2003 | Dwyer | |
| 6,759,790 B1 | 7/2004 | Bugel et al. | |
| 6,870,305 B1 | 3/2005 | Moler | |
| 2001/0030306 A1 | 10/2001 | Moler et al. | |
| 2004/0035106 A1 | 2/2004 | Moler | |
| 2004/0045148 A1 | 3/2004 | Moler | |
| 2004/0125472 A1 | 7/2004 | Belt | |

FOREIGN PATENT DOCUMENTS

| | | |
|---|---|---|
| DE | 10122297 C1 | 6/2002 |
| EP | 61276981 | 12/1986 |
| EP | 0 325 764 | 2/1989 |
| EP | 01185175 | 7/1989 |
| EP | 1 391 647 | 6/2003 |
| GB | 2203195 A | 10/1988 |
| WO | WO 01/78160 | 10/2001 |

OTHER PUBLICATIONS

High Speed Servo Pneumatic Actuator Systems; (modified on Jan. 13, 2004); Design of High Speed Machinery (DHSM) LINK Programme; Engineering & Physical Sciences Research Council; Department of Trade & Industry; Mar. 1995 to Aug. 1997, Grant Reference: GR/K38663.

Journal of Zhejiang University SCIENCE; (ISSN 1009-3095, Monthly), 2001 vol. 2, No. 2, pp. 128-131; CLC No.: TP271, 32: Document Code: A Research on the Continuous Positioning Control to Servo-Pneumatic System; Tao Guo-liang, Wang Xuan-yin, & Lu Yong-xiang.

Modeling and Simulation of a Servopneumatic Gripper; Salvador Esque and Jose LM Lastra, date Dec. 10, 1999.

Modified Feedback Linearization Controller for Pneumatic System with Non-Negligible Connection Port Restriction; Pascal Bigras, Karim Khayati, Tony Wong; University of Quebec.

ND9000 Intelligent Valve Controller; Metso Automation; date Jul. 7, 2003.

Introducing Precisionaire—A Breakthrough Pneumatic Motion System.

Axis Controller SPC 200; Festo AG&Co.; Products 2001.

Kuhnke "SPEEDY" Machine Building Process Module; Switched Pneumatic Electrical Endposition Damping-E635 GM/02 92.652.

Switched Pneumatic Electrical Endposition Damping; Werner Brockman; University of Lubeck Institute of Computer Engrg. Lubeck, Germany.

Block-Oriented Nonlinear Control of Pneumatic Actuator Systems; fulin Xiang; Doctoral Thesis, Mechatronics Lab, Deprtment of Machine Design, Royal Institute of Technology, KTH; S-100 44, Stockholm, Sweden, 2001.

Hydraulic & Pneumatic Actuators; Sensors & Actuators for Mechatronics Hydaulic and Pneumatic Actuators; K. Craig.

Adaptive Neuron Control Based on Predictive Model in Pneumatic Servo System; Huang Wenmei, Yang Yong, Tang Yali; College of Mechanical and Automotive Engrg. Human University, 410082, Changsha, Huna, P.R. China.

Propneu—An Intelligent Software Tool; Hong Zhou, Ph..D., Festo AG & Co., Ruiterstr, 82, D-73734, Esslingen, Germany.

Pneumatic Servo Systems Controled By Self-Tuning Fuzzy Rules; Akira Shimizu, Satoru Shibata, and Mitsuru Jindai, Dept. of Mech. Eng. Ehime Univerity, 3, Bunkyo-cho, 790-8577, Matsuyama, Ehime, Japan.

Modelica—Proceedings of the 3$^{rd}$ International Modelica Conference, Linkoping, Nov. 3-4, 2003, Peter Fritzson (editor).

High Steady-State Accuracy Pneumatic Servo Positioning System with PVA/PV Control and Friction Compensation; Shu Ning and Gary M. Bone; Dept. of Mechanical Engrg., McMaster University, Hamilton, Ontario, Canada, L8S 4L7. Proceedings of the 2002 IEEE, International Conference On Robotics & Automation, Washington, DC—May 2002.

A Hybrid Pneumatic/Electrostatic Mili-Actuator; Kenneth H. Chiang, Ronald S. Fearing; Robotics and Intteligent Machines Laboratory; Dept. of Electrical Engrg. And Computer Sciences; 265M Cory Hall, University of California, Berkeley, CA 94720-1770.

Modeling Identification, and Control of Pneumatically Actuated, Force Controllable Robot; J.E. Bobrow and B.W. McDonell; Irvine, California 92697.

Modelling and Simulation of Pneumatic Cylinders for a Physiotherapy Robot; R. Richardson, A.R. Plummer, M. Brown; School of Mechanical Engrg., University of Leeds, UK; Instron Ltd., UK.

Study of Pneumatic Motion Base, Control Characteristics; Kenji Okiyama and Ken Ichiryu, Tokyo University of Technology, Katakuracho 1404-1, Hachioji-city, Tokyo, Japan, date unspecified.

* cited by examiner

PIEZO-ELECTRIC ACTUATED MULTI-VALVE MANIFOLD

CROSS-REFERENCE TO RELATED APPLICATIONS

This application claims the benefit of U.S. provisional patent application Ser. No. 60/460,666 filed on Apr. 4, 2003, and is a continuation-in-part of U.S. patent application Ser. No. 10/107,951 filed Mar. 27, 2002 now U.S. Pat. No. 6,759,790 and a continuation-in-part of U.S. patent application Ser. No. 10/613,138 filed on Jul. 3, 2003.

FIELD OF THE INVENTION

The present invention relates to at least one piezo-electric actuated valve capable of two-way or three-way operation for on/off or proportional control of fluid passing between at least one inlet port and at least one outlet port of a fluid passageway.

BACKGROUND OF THE INVENTION

Commercially available solenoid operated valves typically are available in sizes down to a minimum 6 mm in diameter. Although valves smaller than 4.5 mm exist, the valves are much smaller, and are based on alternate construction and/or actuation techniques such as MEMS. In general, smaller solenoid based valves do not exist, because as the solenoid decreases in size, the work capability of the solenoid is reduced to the point where the solenoid is incapable of providing operation of the valve for the desired valve pressures and flow rates. It would be desirable in the present invention to provide an electrically actuated valve capable of being sized to 4.5 mm or less.

Commercially available solenoid actuated proportional valves are typically no smaller than 15 mm in diameter. The issue is not merely the raw power of the electromagnetic field as the coil decreases, but rather the ability to control the operation of the valve in a predictable linear fashion is extremely difficult. Further, a proportional valve is continually operating, thus typically requiring greater heat dissipation/handling ability than a simple on/off valve. It would be desirable to provide an electrically actuated valve capable of two-way or three-way operation, and capable of either on/off mode of operation or proportional mode of operation.

Typical commercially available solenoid valves respond with times in a range from 5 ms to 20 ms. Higher speed for the solenoids can be achieved, but generally require special electronic control such as overexcitation or special coil construction. It would be desirable to provide an electrically actuated, direct acting valve capable of response times in a range less than 5 ms, and preferably approximately 1 ms.

Commercially available, competitively sized valves based on solenoid actuation generally are sized on the order of 6 mm to 16 mm pitch and can exceed 22 mm. Further, the commercially available solenoid valves generally consume between 0.5 and 4.0 watts. Other piezo valves have lower power consumption compared to such solenoid actuated valves, but none of the piezo valves have the desired level of flow and pressure capability on a direct acting basis in as narrow a size. Piezo valves that do have the desired level of pressure and flow capability typically reach the desired levels when acting as a pilot valve for a larger valve, where the larger valve provides the desired level of pressure and flow capability. Alternatively, piezo valves can reach the desired performance levels but require greater width. It would be desirable in the present invention to provide a direct acting electrically actuated valve with high pressure and high flow capabilities without acting as a pilot valve for a larger valve and with a narrow width.

Although narrower examples are available, commercially available proportional valves can be, for example, approximately 22.2 mm in diameter and 39.6 mm tall. The version of such a commercially available proportional valve with an orifice size of ~1.5 mm can flow up to fourteen standard liters per minute (slpm) at the maximum pressure of twenty-five pounds per square inch (psi). Further, the maximum rated pressure at any flow for the commercially available proportional valve is 100 psi. It would be desirable to provide an electrically actuated proportional valve which can operate at over 120 psi with a 1.5 mm equivalent orifice, and to provide an electrically actuated proportional valve which at 80 psi can flow up to approximately 50 slpm.

SUMMARY OF THE INVENTION

An apparatus according to the present invention controls the flow of a fluid from at least one inlet port to at least one outlet port through a fluid flow passage in response to an electrical activation. The apparatus can include a support having a rigid, non-flexible portion, at least one pivotable relatively rigid, non-flexible, folded-back arm portion extending from the rigid portion, at least one surface associated with the at least one folded-back arm portion for movement relative to the support, and a rigid, non-flexible force transfer member operably positioned for driving the at least one pivotable folded-back arm portion in rotational movement. An electrically operated actuator operably engages between the rigid, non-flexible portion and the force transfer member to drive the force transfer member relative to the rigid, non-flexible portion to pivot the at least one pivotable folded-back arm portion in response to an electrical activation of the actuator wherein the work produced by the rotational movement of the at least one pivotable folded-back arm portion can be greater than 60% of the work produced by the electrically operated actuator. A manifold includes a fluid passage communicating with at least one valve seat and operably engageable with respect to at least one corresponding valve body for movement between a closed position in sealing engagement with the valve seat and an opened position spaced from the valve seat, wherein at least one of the valve seat and valve body is operably movable with respect to the other by the electrically operated actuator through the support in response to an electrical activation.

The multi-valve manifold according to the present invention can house and provide fluid connections for multiple piezo actuated, direct acting valves. The current design of the valves is three-way on-off. These valves can be used for various applications including, by way of example and not limitation, mixing and diverting. In the current configuration, the manifold provides a common inlet port, a common exhaust port, and an outlet port unique to each valve. It also provides a single point for electrical connection and in some configurations the manifold will also house the system power supply and valve control. This same three-way valve configuration can be operated in a proportional mode for mixing or blending applications. In such applications, the common exhaust port, described above, would be used as a second common inlet port. Alteration of the flow can enable use for diverting applications. In support of mixing, blending or diverting, check valves can be incorporated to prevent undesirable flow.

A unique design feature of the multi-valve manifold pack is that the valve spacing is set at 4.5 mm. This tight spacing allows, for example, the valve to provide direct dispensing of analytical fluids. Such fluids can be transferred into titration wells that are currently spaced 4.5 mm apart in typical titration trays using, for example, a nozzle directly attached to the outlet ports of the manifold or minimal interface tubing from the valves to the wells. This can improve dispensing accuracy, save reagent volumes and improve dispensing times. Typical existing valve manifolds use 10 mm spacing, thus requiring complex valve mounting geometries and extensive tubing or manifolding to transfer the fluid being dispensed from the valve. The present invention provides for nozzles attached to the manifold on 4.5 mm pitch and in line with the valves located at 4.5 mm spacing from one another mounted on the manifold, i.e. the valve is inline and very close so that there is minimal "dead volume" from the valve to the dispensing orifice or nozzle.

Another unique feature of the valve is its high flow capacity within the 4.5 mm pitch spacing. At 80 psig the valve in the three-way configuration will flow approximately 50 standard liters per minute (slpm). Existing valves, even based on a 10 mm width, do not typically flow more than 20 lpm. Thus the valve of the present invention can, by way of example and not limitation, also be used very effectively to pilot much larger pneumatically actuated valves.

In a two-way configuration the valves can operate as proportional fluid controls. This level of control is believed to be unique in such small packaging. Further, the flow rates of valves according to the present invention would substantially exceed the performance of known comparable valves.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
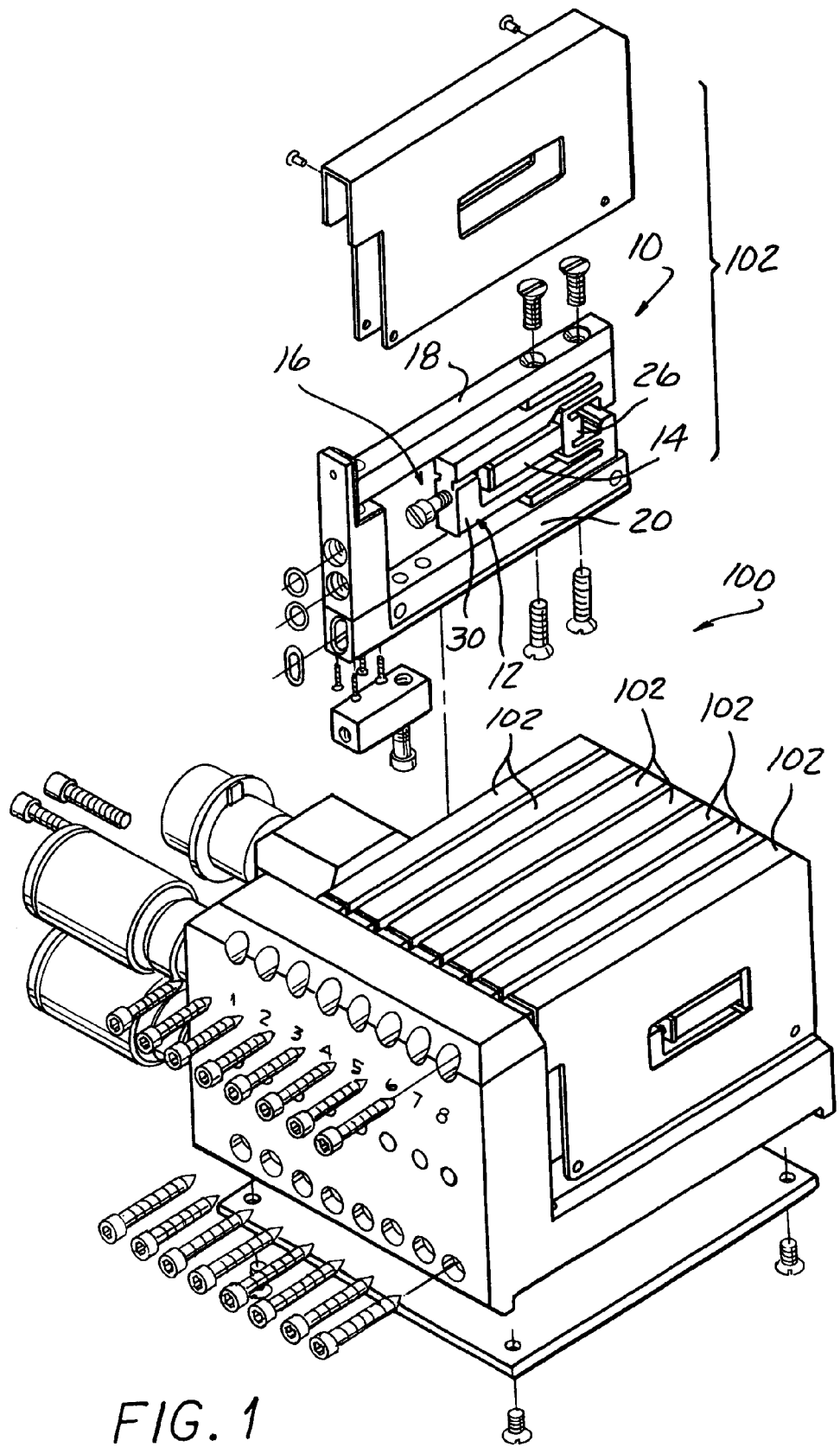
FIG. 1 is an exploded view of a multi-valve manifold according to the present invention.
Figure 2:
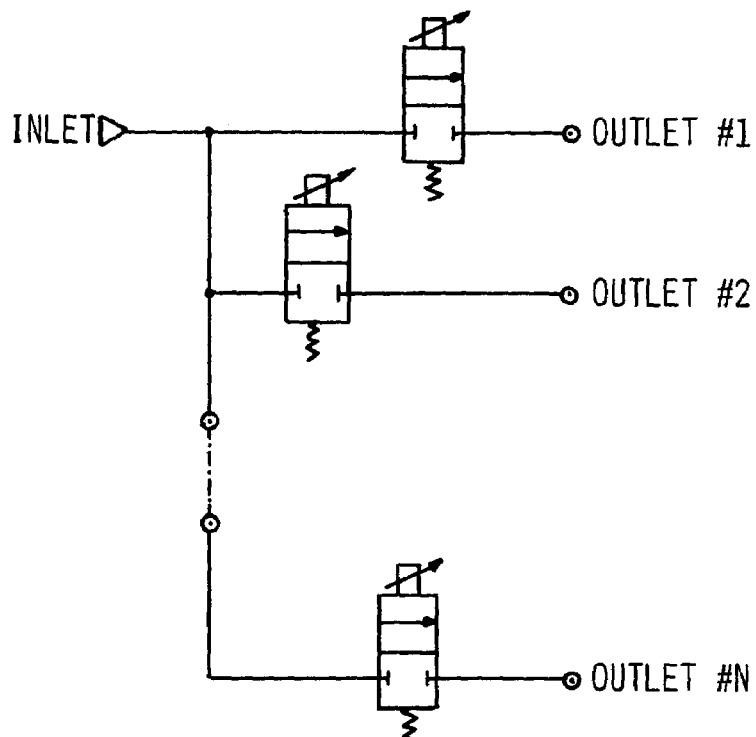
FIG. 2 is a schematic diagram illustrating two-way operation of a multi-valve manifold according to the present invention.
Figure 3:
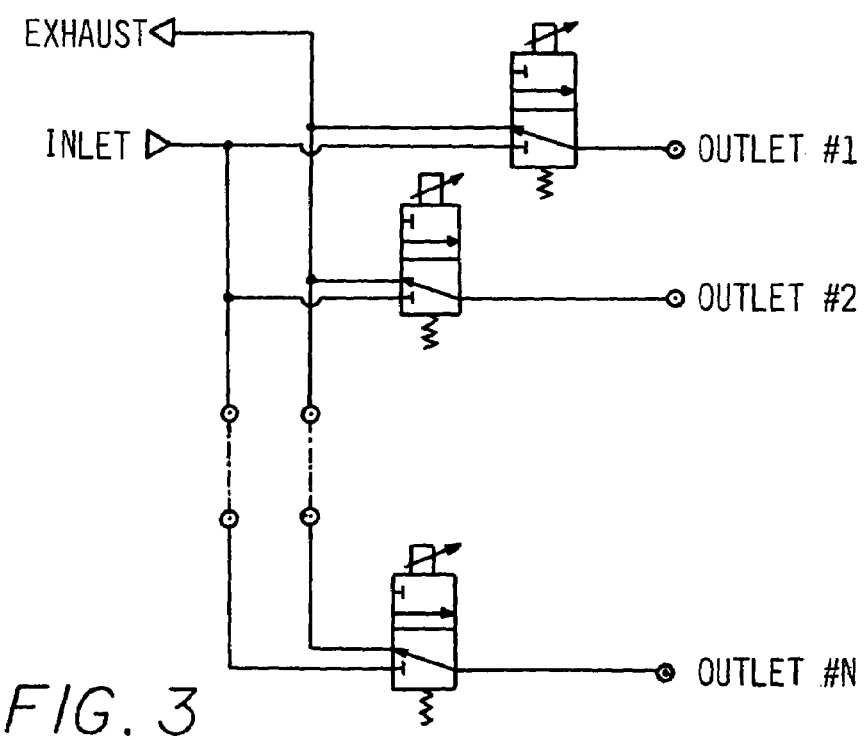
FIG. 3 is a schematic diagram illustrating three-way operation of a multi-valve manifold according to the present invention.

Referring now to FIGS. 1–3, the present invention includes a multi-valve manifold 100. Each valve 102 in the manifold 100 can be, by way of example and not limitation, 4.2 millimeters (mm) wide by 31 mm tall by 46 mm long. The narrow width of the actuator/valve combinations according to the present invention allows the actuator/valve combinations to be located on the manifold at a center-to-center spacing, or pitch, of 4.5 mm apart from one another in order to provide an advantageous titration tray dispensing embodiment discussed in greater detail below. The 4.2 mm width is believed to be narrower than any other "meso-scale" electrically actuated valve, and therefore unique in the industry. The closest known commercially available solenoid operated valve is 6 mm in diameter. Although electrically actuated valves smaller than 4.5 mm exist, the valves are much smaller, and are based on alternate construction and/or actuation techniques. In general, smaller solenoid based valve does not exist, because as the solenoid decreases in size, the work capability of the solenoid is reduced to the point where the solenoid is incapable of providing operation of the valve for the desired valve pressures and flow rates.

Competitively performing existing valves generally are sized on the order of 6 mm to 16 mm pitch, and generally consume between 0.5 and 4.0 watts. In comparison once actuated, the piezo-electric actuator of the present invention draws less than 0.010 watts. Other piezo valves have such a low power consumption. None have the flow and pressure capability on a direct acting basis. Those that do have the pressure and flow capability only do so when acting as a pilot for a larger valve. Benefits of the present invention include: direct control using logic level circuits, potential for long life battery operation, potential for radio frequency (RF) operation with photovoltaic cell, battery or other low power electric source, virtually no heat generation—important for certain applications such as biomedical or analytical. Minimal heat generation is also important, because it eliminates, or at least greatly reduces the requirement for cooling considerations. The heat generated and associated heat transfer to the fluid being metered is not only a function of the solenoid coil versus piezo, it is also related to the fact that the present invention is able to separate the fluid control portion of the valve from the heat generating, actuation portion. With a solenoid based valve, frequently the fluid passages are very close to the coil. As the size decreases, the relative proximity tends to increase. In some cases, the fluid passage of a solenoid based valve actually pass "through" a passage within the heat generating coil of the solenoid. The multi-valve manifold having fluid control portions separate from piezo actuator portions according to the present invention avoids this disadvantage of the solenoid based valve.

Separate from raw size, the fact that the valve spacing is 4.5 mm pitch (4.5 mm on center valve to valve) allows the valves to line up exactly with the well in a standard 384 well microtitration tray. This is a potential benefit for analytical automation applications. Presently this is accomplished using various complex configurations such as: custom manifolds; custom plumbing from the valve to the wells; micro electromechanical system (MEMS) based dispensers; robotics; etc. The multi-valve manifold according to the present invention, by way of example and not limitation, can include an eight-pack manifold which can be doubled up to provide a sixteen valve version in order to allow direct dispensing into a complete row of wells in a standard 384 microtitration tray.

Each valve is capable of on/off operation and also proportional operation. By comparison, the closest known commercially available solenoid actuated proportional valve is no smaller than 15 mm in diameter. The issue is not merely the raw power of the electromagnetic field as the coil decreases. The ability to control the operation of the valve in a predictable linear fashion is also much more difficult. Further, a proportional valve is continually operating, thus requiring greater heat dissipation/handling ability than a simple on/off valve.

The valves have the potential to respond to on/off operations faster than 1 millisecond (ms). Typical competitive solenoid valves respond in 5 ms to 20 ms. Higher speed for the solenoids can be achieved, but typically require special electronics such as overexcitation or use special coil construction.

The fluid portion of each valve can be pressure balanced. This allows the use of a comparatively smaller actuator while providing high flow and pressure capability. As an example, the recently announced Clippard EVP proportional valve is 22.2 mm in diameter and 39.6 mm tall. The version with an orifice sized comparable to the orifice in each valve of the present invention (~1.5 mm) can flow fourteen standard liters per minute (slpm) at the maximum pressure of twenty-five pounds per square inch (psi). Further, the maximum rated pressure at any flow for the Clippard EVP proportional valve is 100 psi. By comparison, each valve according to the present invention can operate at over 120 psi with the standard 1.5 mm equivalent orifice, and at 80 psi the valve according to the present invention can flow up to approximately 50 slpm. The combination of the pressure balanced fluid control valve with the piezo actuator according to the present invention provides the improved performance, i.e. pressure balancing reduces the work that the actuator must produce thereby allowing the use of smaller piezo actuators. In addition, the unique basic form factor of the piezo actuator according to the present invention, i.e. narrow relative to the other dimensions, especially when compared to solenoids, enables the overall narrow form of the valves according to the present invention.

It should be recognized that the present invention can be modified to provide the one or more of the following features: control electronics located in the manifold "bottom" rather than merely an electrical interface; for either two-way or three-way operation; simplified valve mounting into the manifold so that additional screws are not needed; a manifold with valves in any quantity other than 8 valves, for example 2, 3, 4, 5, . . . 8, . . . 16, . . . n; a fluid inlet port located in alternate position, by way of example and not limitation, such as a "bottom" entry and located central to the valves to reduce the distance from the inlet to the furthest valve (manifold dead volume); for use of non-pressured balanced valve, which would offer less flow but can offer other benefits, by way of example and not limitation, such as longer life or simpler assembly; various size multi-valve manifolds since the valve width according to the present invention is potentially scalable to smaller sizes, by way of example and limitation, to approximately half the width of the valve discussed above (i.e. 4.5 mm), and scaled to much larger sizes, by way of example and not limitation, to approximately 25 mm in width; the manifold and valve components made from metal or any suitable other alternate materials known to those skilled in the art; the inlet and outlet port connectors including tubing "quick connects" or any other suitable alternative connections known to those skilled in the art.

Figure 4:
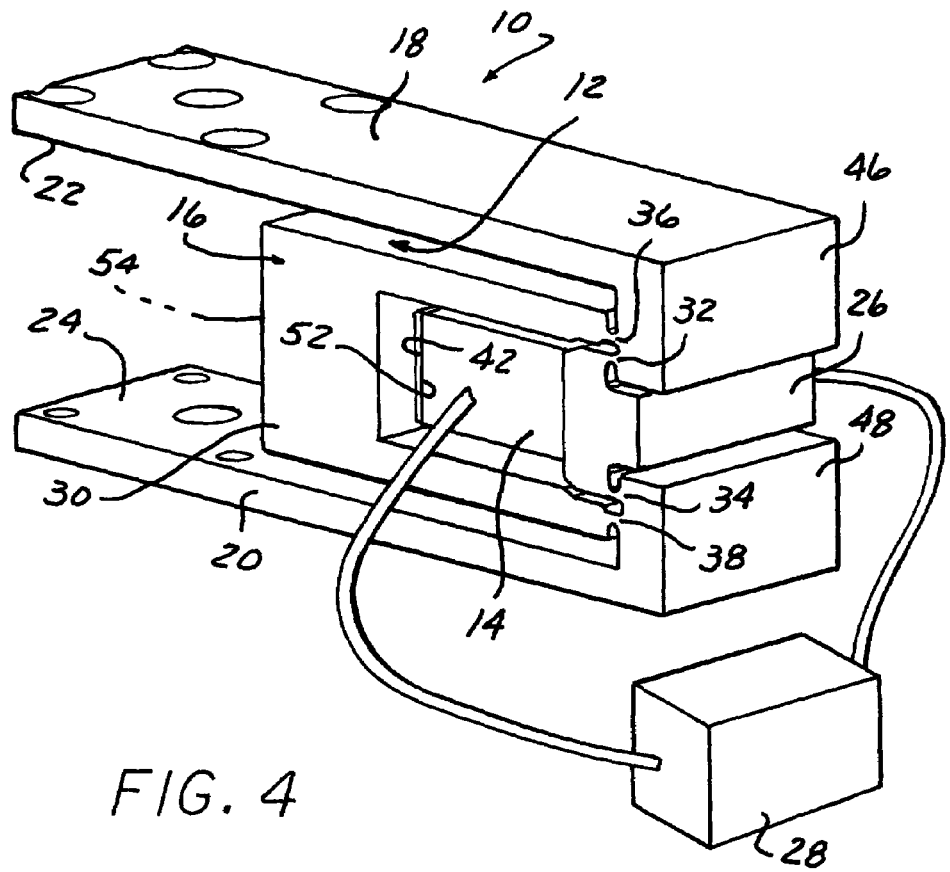
FIG. 4 is a perspective view of an actuator assembly for moving at least one folded-back arm having at least one surface in response to an electrical activation, the actuator assembly having a support member and an electrical actuator according to the present invention.

FIG. 4 is a perspective view of an actuator assembly 10 having a support 12 and an electrical actuator 14 in accordance with the present invention. The support 12 includes a rigid, non-flexible portion 16, at least one pivotable relatively rigid, non-flexible arm portion, such as first and second pivotable arm portions 18, 20 extending rearward from the rigid portion 16, at least one opposing surface 22, 24 on the at least one pivotable arm portion 18, 20 for movement relative to to the rigid portion 16, and a rigid, non-flexible force transfer member 26 operably connected with the at least one pivotable arm portion 18, 20. Preferably, the support 12 is a unitary, integral, single-piece monolithic body. The electrical actuator 14 can be operably engaged between the rigid, non-flexible portion 16 and the rigid, non-flexible force transfer member 26 to drive the force transfer member 26 in linear motion away from the rigid, non-flexible portion 16 in response to electrical stimulation of the electrical actuator 14. It should be recognized that the rigid, non-flexible portions of the support 12 can provide transfer of motion from the electrical actuator 14 with a loss of work of less than 40%, preferably with a loss of work of less than 20%, and most preferably with a loss of work of less than 10%. The at least one pivotable relatively rigid non-flexible arm 18, 20 is rigid and non-flexible in an environment with relatively limited temperature variations or in a temperature controlled environment. It should be recognized that the at least one pivotable arm 18, 20 can include temperature compensation for improved on/off operation and/or proportional operation control over a wider range of environmental temperatures, if desired.

The rigid non-flexible portion 16 can receive an adjustable support 54 with an adjustable seat 52 having a complementary surface to the end 42 of the actuator 14. The complementary surface of the adjustable seat 52 can be flat or shaped in any manner to support the actuator 14 in a position suitable for driving the force transfer member 26 in response to an electrical actuation of the actuator 14. Movement of the rigid, non-flexible force transfer member 26 pivots the at least one pivotable arm portion 18, 20 about at least one living hinge 36, 38. At least one living hinge 36, 38 extends between each rigid arm portion and a pivotal base portion 46, 48 of each corresponding pivotable relatively rigid, non-flexible arm portion, and at least one living hinge 32, 34 extends between the corresponding base portion 46, 48 of the pivotable relatively rigid, non-flexible arm portions and the rigid force transfer member 26.

A controller 28 can be provided to operate the apparatus 10. The controller can provide a charging voltage across the piezoelectric device to produce spatial displacement along a predetermined axis. The amount of electrical charge stored by the piezoelectric device is generally proportional to the amount of voltage applied across the piezoelectric device. Thus, varying the amount of voltage applied across the piezoelectric device can control the amount of spatial displacement along one predetermined axis. This spatial displacement is transferred and amplified via the living integral hinge 36, 38 into the at least one rigid, non-flexible pivotable arm 18, 20 causing the corresponding one of the opposing surfaces 22, 24 to move in a curvilinear path with respect to the other.

Figure 5:
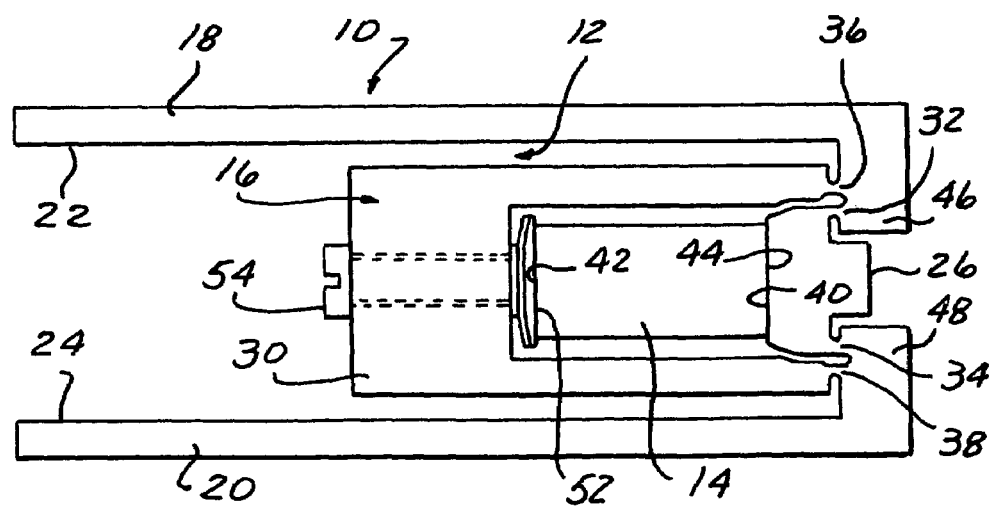
FIG. 5 is a side view of the actuator assembly of FIG. 4 with the electrical actuator deactivated.
Figure 6:
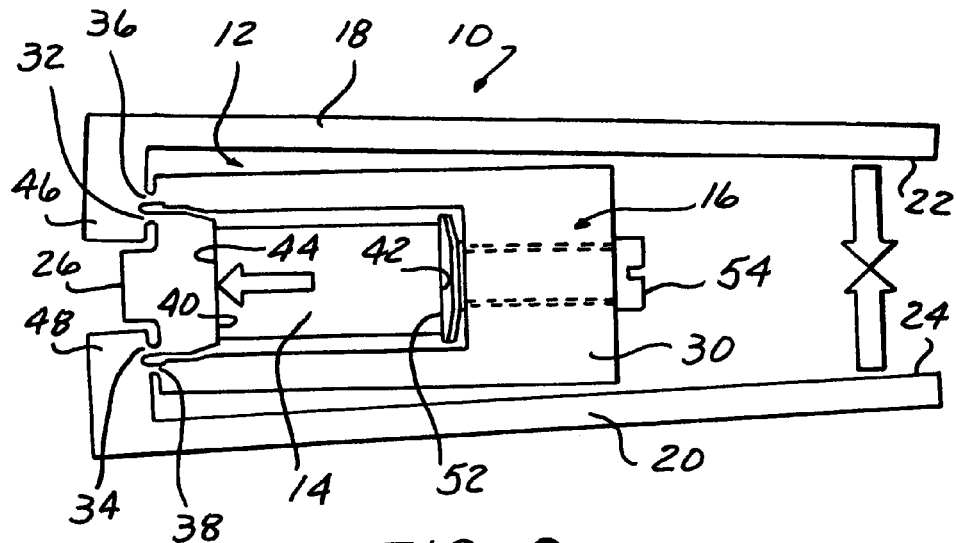
FIG. 6 is an exaggerated side view of the actuator assembly of FIG. 4 with the electrical actuator fully activated.

In FIG. 5, the actuator 14 is deactivated. The opposing surfaces 22, 24 are furthest from each other when the actuator 14 is deactivated. This type of configuration can sometimes be referred to as a normally open design. When the electrical actuator 14 is electrically activated, the set end 42 of actuator 14 is held fixed by the rigid portion 16, the driving end 44 of the actuator 14 drives the rigid, non-flexible force transfer member 26 away or apart from the rigid web 30, and the at least one pivotable relatively rigid, non-flexible arm portion 18, 20 is pivoted about at least one corresponding living hinge 36, 38. In this manner, the space or distance between the opposing surfaces 22, 24 is decreased. The distance between the opposing surfaces can be increased or decreased by adjusting the voltage across an electrical actuator 14, such as a piezo-electric actuator. FIG. 6, illustrates the planar driving end 44 of the actuator 14 in operable contact with the planar seat surface 40 of the rigid, non-flexible force transfer member 26, when the actuator 14 is fully activated and is exaggerated to show a larger closing between the opposing surfaces 22, 24.

In the embodiment illustrated in FIGS. 4–6, these components have been machined from a single monolithic piece of metallic material for example stainless steel. Other suitable materials can include powdered metal, metallic alloys, composite materials, or a combination of metallic and composite materials. Although these materials given as examples provide excellent performance, depending on the requirements of a particular application, use of other materials for the support can be appropriate. Some components like the pivotable rigid, non-fexible arm portions can be manufactured separate from the rigid non-flexible generally C-shaped or generally U-shaped structure and joined later to define the generally W-shaped or generally M-shaped combined structure as illustrated in FIG. 6.

Figure 7:
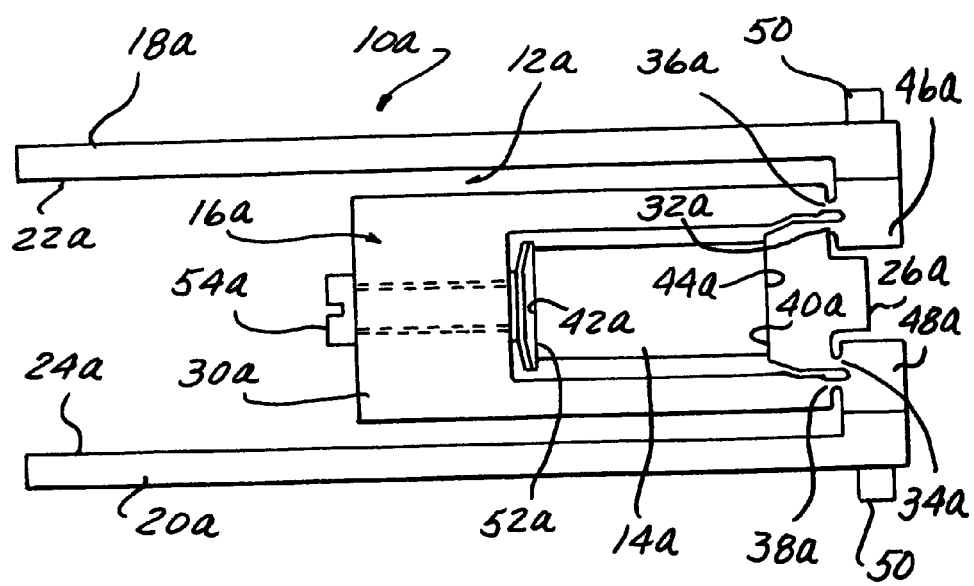
FIG. 7 is a side view of the actuator assembly with mechanically fastened pivotable relatively rigid, non-flexible arm portions connected to the rigid, non-flexible portion of the support and extending outwardly from a location of a living hinge.

In the embodiment illustrated in FIG. 7, the apparatus 10a is made with four discrete components. The first component includes the rigid, non-flexible support 12a including a rigid, non-flexible web 30a connecting rigid, non-flexible arm portions to define a generally C-shaped or generally U-shaped portion of the apparatus 10a. At least one living hinge 36a, 38a extends between each rigid arm portion and a pivotal base portion 46a, 48a of each corresponding pivotable rigid, non-flexible arm portion, and at least one living hinge 32a, 34a extends between the corresponding base portion 46a, 48a of the pivotable rigid, non-flexible arm portions and the rigid, non-flexible force transfer member 26a. The second and third components are the separable and pivotable rigid, non-flexible arm portions 18a, 20a attached to the corresponding bases 46a, 48a of the support 12a using fasteners 50. The fourth component is the actuator 14a operably engaged between the rigid, non-flexible web 30a and the rigid, non-flexible force transfer member 26a. An adjustable support 54a can be provided with an adjustable seat 52a having a complementary surface to an end 42a of the actuator 14a. The complementary surface of the adjustable seat 52a can be flat or shaped in any manner to support the actuator 14a in a position suitable for driving the rigid, non-flexible force transfer member 26a in response to electrical actuation of the actuator 14a.

The disclosure of the actuator configuration and operation from U.S. patent application Ser. No. 10/107,951 filed Mar. 27, 2002 and U.S. patent application Ser. No. 10/613,138 filed Jul. 3, 2003 are incorporated by reference herein in their entirety. The disclosure of the 8 Pack Manifold from U.S. provisional application Ser. No. 60/460,666 filed Apr. 4, 2003 is incorporated by reference herein in its entirety.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for controlling flow of a fluid from at least one inlet port to at least one outlet port through a fluid flow passage in response to an electrical activation comprising:
a support having a rigid, non-flexible portion, at least one pivotable relatively rigid, non-flexible, folded-back arm portion extending from the rigid portion, at least one surface on the at least one folded-back arm portion for movement relative to the support, and a rigid, non-flexible force transfer member operably positioned for driving the at least one pivotable folded-back arm portion in rotational movement with a loss of motion of less than 40%;
an electrically operated actuator operably engaged between the rigid, non-flexible portion and the force transfer member to drive the force transfer member relative to the rigid, non-flexible portion to pivot the at least one pivotable folded-back arm portion in response to an electrical activation of the actuator; and
a manifold including a fluid passage communicating with at least one valve seat and operably engageable with respect to at least one corresponding valve body for movement between a closed position in sealing engagement with the valve seat and an opened position spaced from the valve seat, wherein at least one of the valve seat and valve body is operably movable with respect to the other by the electrically operated actuator through the support in response to an electrical activation.

2. The apparatus of claim 1, wherein the at least one valve seat and corresponding valve body define a pressure balanced valve.

3. The apparatus of claim 1, wherein the at least one valve seat and corresponding valve body define a non-pressure balanced valve.

4. The apparatus of claim 1, wherein the manifold supports and connects at least two valves to at least one inlet port and at least one outlet port with an individually operable electrical actuator for each valve, and at least two fluid dispensing orifices associated with the manifold, each orifice spaced 4.5 mm from one another and positioned inline with a corresponding fluid control valve, such that the corresponding valve is immediately adjacent the orifice minimizing dead volume between each valve and the corresponding orifice.

5. The apparatus of claim 1, wherein the electrically operated actuator is a piezoelectric actuator.

6. The apparatus of claim 1, wherein the rigid portion is generally U-shaped and includes a web extending between a pair of rigid arm portions.

7. The apparatus of claim 6, wherein one of the pivotable folded-back arm portions is pivotably connected to one of the rigid arm portions and the other of the pivotable folded-back arm portions is pivotably connected to the other of the rigid arm portions.

8. The apparatus of claim 7, wherein the rigid portion of the support is interposed between the pivotable folded-back arm portions, such that the force transfer member is adjacent one end of the pivotable folded-back arm portions and the at least one surface defines opposing surfaces on the pivotable folded-back arm portions located adjacent to the web of the support.

9. The apparatus of claim 7, wherein the pivotable arm portions are mechanically connected to the support.

10. An apparatus for controlling flow of a fluid from at least one inlet port to at least one outlet port through a fluid passage in response to an electrical activation comprising:

a support having a rigid non-flexible portion, first and second pivotable relatively rigid, non-flexible folded-back arm portions extending from the rigid portion, such that the rigid portion is positioned interposed between the first and second pivotable folded-back arm portions, a pair of opposing surfaces with one opposing surface supported by each of the pivotable folded-back arm portions for movement relative to one another, and a rigid, non-flexible force transfer member operably positioned for driving the first and second pivotable folded-back arm portions in rotational movement with a loss of motion of less than 40%, and first and second flexible hinge web portions extending in close proximity to one another allowing flexing movement of the at least one relatively rigid, non-flexible folded back arm with respect to the rigid portion and the force transfer member;

an electrically operated actuator operably engaged between the rigid non-flexible portion and the rigid, non-flexible force transfer member to drive the force transfer member relative to the rigid portion to pivot the first and second pivotable folded-back arm portions in response to an electrical activation of the actuator; and a manifold including at least one fluid passage communicating with at least one valve seat and operably engageable with respect to at least one corresponding valve body for movement between a closed position in sealing engagement with the valve seat and an opened position spaced from the valve seat, wherein at least one of the valve seat and valve body is operably movable with respect to the other in response to an electrical activation of the electrically operated actuator through the support.

11. The apparatus of claim 10, wherein the at least one valve seat and corresponding valve body define a pressure balanced valve.

12. The apparatus of claim 10, wherein the at least one valve seat and corresponding valve body define a non-pressure balanced valve.

13. The apparatus of claim 10, wherein the manifold supports and connects at least two valves to at least one inlet port and at least one outlet port with an individually operable electrical actuator for each valve, and at least two fluid dispensing orifices associated with the manifold, each orifice spaced 4.5 mm from one another and positioned inline with a corresponding fluid control valve, such that the corresponding valve is immediately adjacent the orifice minimizing dead volume between each valve and the corresponding orifice.

14. The apparatus of claim 10, wherein the actuator is a piezoelectric device.

15. The apparatus of claim 10, wherein the rigid portion is generally U-shaped and includes a web extending between a pair of rigid arm portions.

16. The apparatus of claim 15, wherein one of the pivotable folded-back arm portions is pivotably connected to one of the rigid arm portions and the other of the pivotable folded-back arm portions is pivotably connected to the other of the rigid arm portions.

17. The apparatus of claim 16, wherein the force transfer member is adjacent one end of the pivotable folded-back arm portions and the opposing surfaces of the pivotable folded-back arm portions are adjacent to the web of the rigid portion of the support.

18. The apparatus of claim 16, wherein the pivotable arm portions are mechanically fastened to the support.

19. An apparatus for moving at least one of a pair of opposing surfaces in response to an electrical activation comprising:

a support having a rigid, non-flexible, single-piece, monolithic portion of generally U-shaped configuration with a web extending between a pair of rigid arm portions, first and second pivotable, relatively rigid, non-flexible, folded-back arm portions of generally L-shaped configuration extending from the rigid arm portions such that the rigid non-flexible portion is positioned interposed between the first and second pivotable folded-back arm portions, a pair of opposing surfaces with one opposing surface on each of the pivotable folded-back arm portions for movement relative to one another, and a rigid, non-flexible force transfer member operably positioned for driving the first and second pivotable folded-back arm portions in rotational movement with a loss of motion of less than 40%, such that the force transfer member is adjacent one end of the pivotable folded-back arm portions and the opposing surfaces of the pivotable folded-back arm portions are adjacent to the web of the rigid non-flexible portion of the support;

first and second flexible hinge web portions extending in close proximity to one another, the first hinge web portion extending between the force transfer member and operably associated with the at least one rigid folded back arm, the second hinge web portion extending between the rigid portion and the at least one rigid folded back arm;

a piezoelectric actuator operably engaged between the rigid non-flexible portion and the force transfer member to drive the force transfer member relative to the rigid non-flexible portion to pivot the first and second pivotable folded-back arm portions in response to an electrical activation of the actuator; and a manifold including at least one fluid passage communicating with at least one valve seat and operably engageable with respect to at least one corresponding valve body for movement between a closed position in sealing engagement with the valve seat and an opened position spaced from the valve seat, wherein at least one of the valve seat and valve body is operably movable with respect to the other in response to an electrical activation of the electrically operated actuator through the support.

20. The apparatus of claim 19, wherein the pivotable arm portions are mechanically fastened to the support.

* * * * *